April 1, 1952  R. B. JOHNSON ET AL  2,591,074
HYPERBOLIC POSITION LOCATING DEVICE
Filed Feb. 21, 1945  9 Sheets-Sheet 1

R.B. JOHNSON
H.A. HENDRICH
G.V.A. MALMROS
INVENTORS

BY *W. M. Wilson*
ATTORNEY

April 1, 1952  R. B. JOHNSON ET AL  2,591,074
HYPERBOLIC POSITION LOCATING DEVICE
Filed Feb. 21, 1945  9 Sheets-Sheet 2

R. B. JOHNSON
H. A. HENDRICH
G. V. A. MALMROS
INVENTORS

BY
ATTORNEY

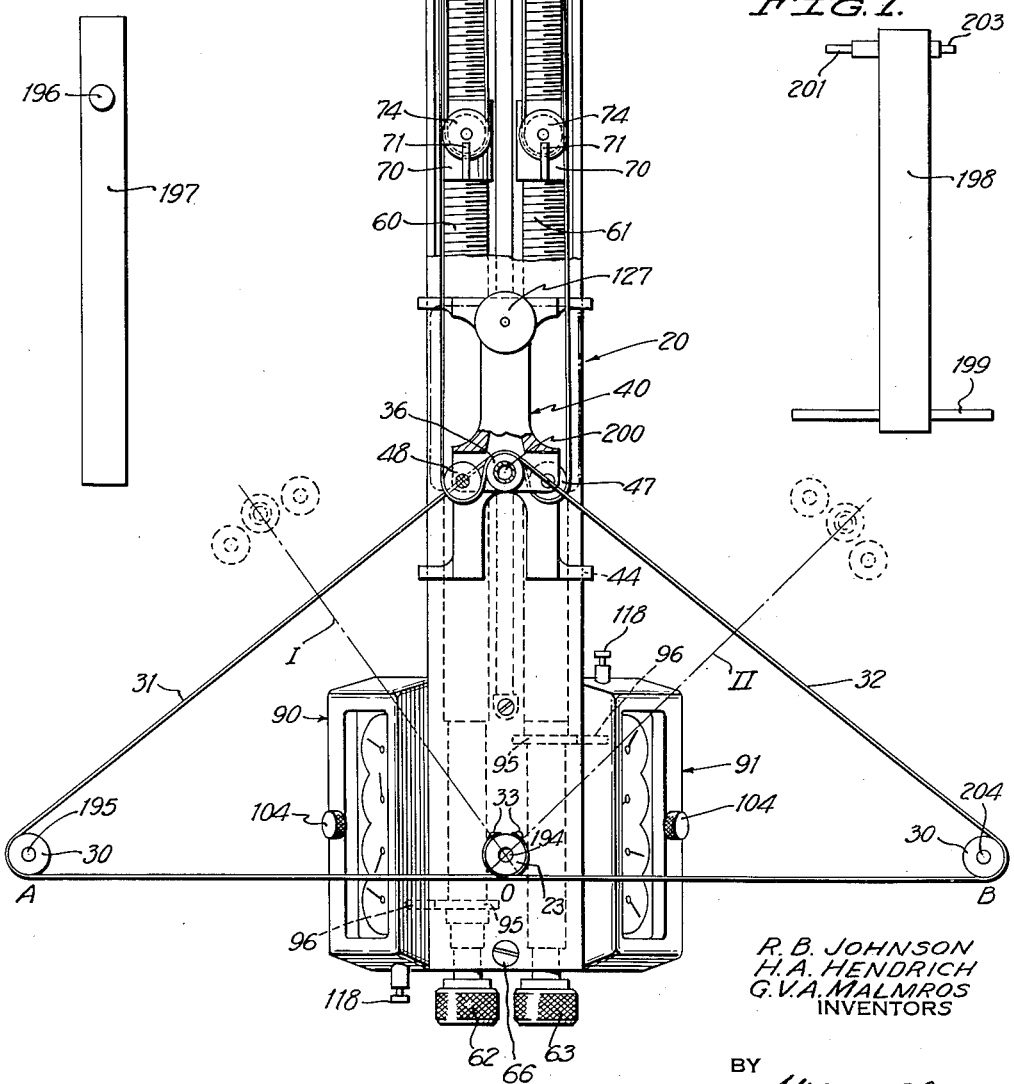

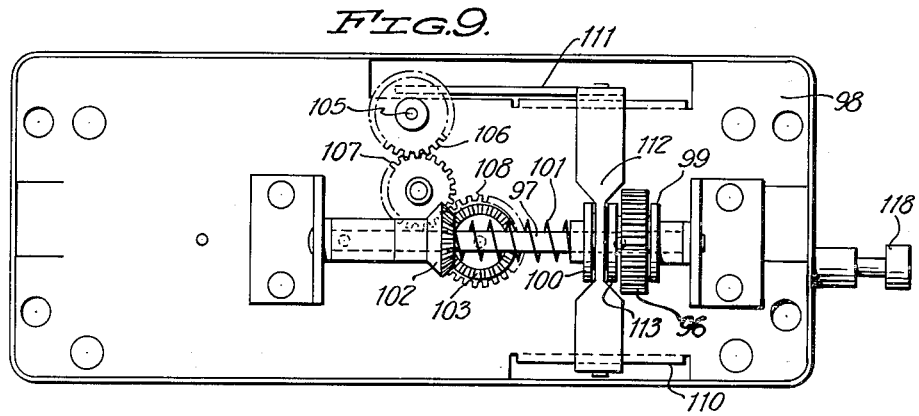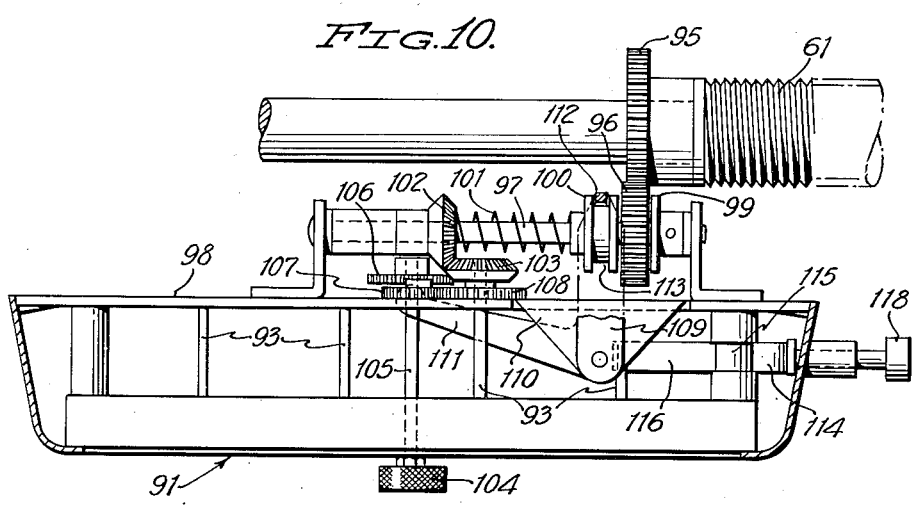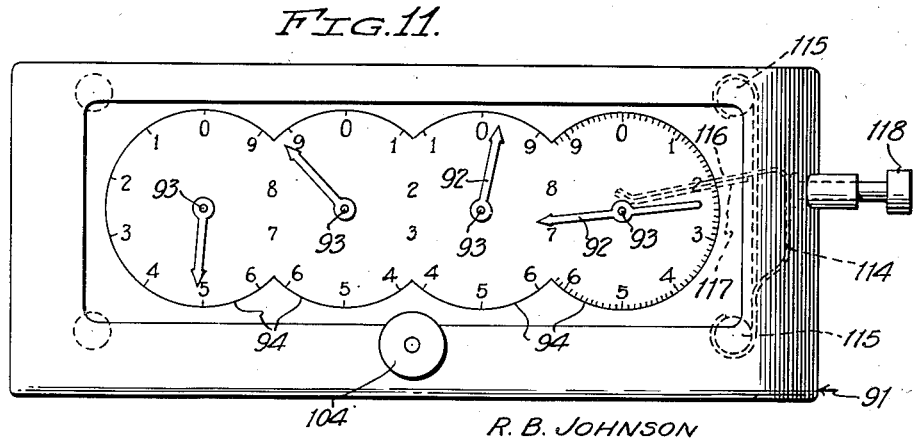

April 1, 1952     R. B. JOHNSON ET AL     2,591,074
HYPERBOLIC POSITION LOCATING DEVICE
Filed Feb. 21, 1945     9 Sheets-Sheet 5
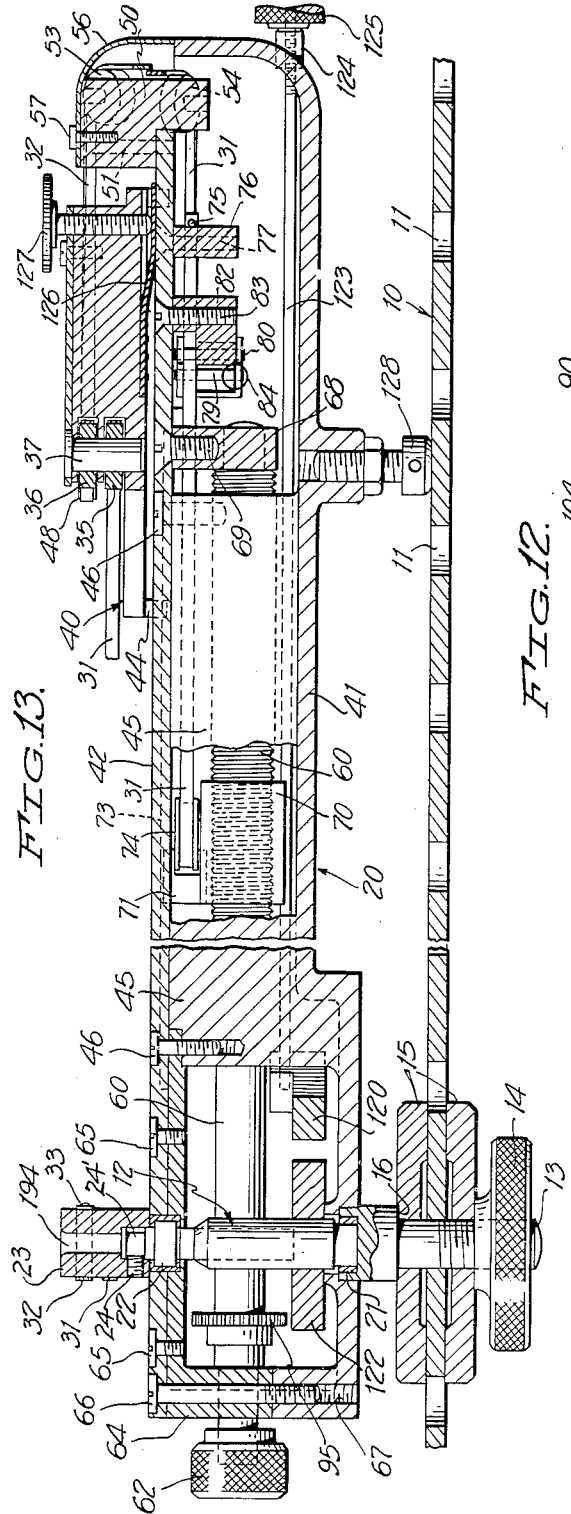
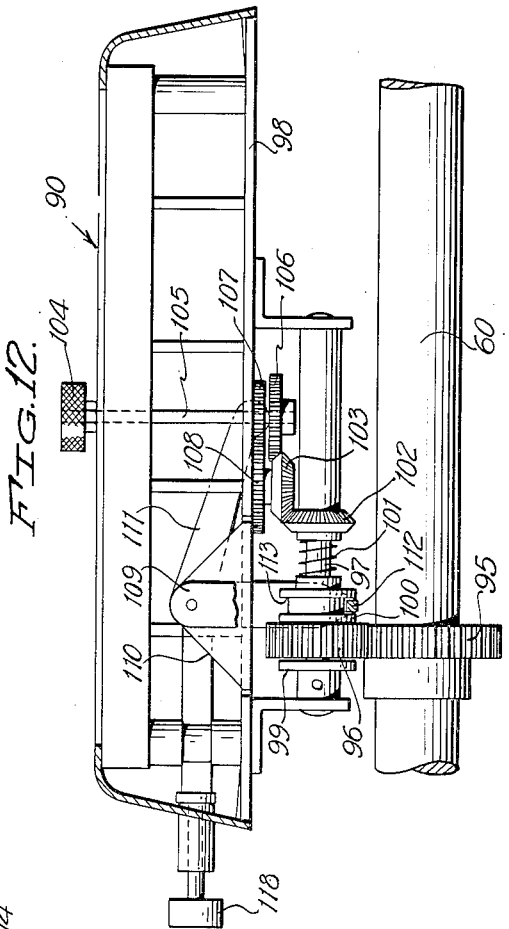
R. B. JOHNSON
H. A. HENDRICH
G. V. A. MALMROS
INVENTORS
BY
ATTORNEY

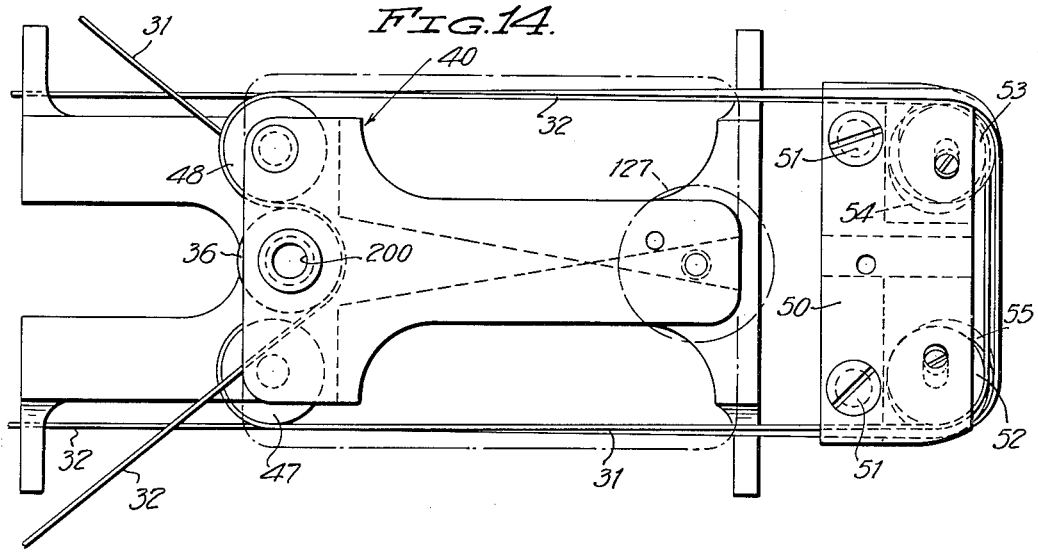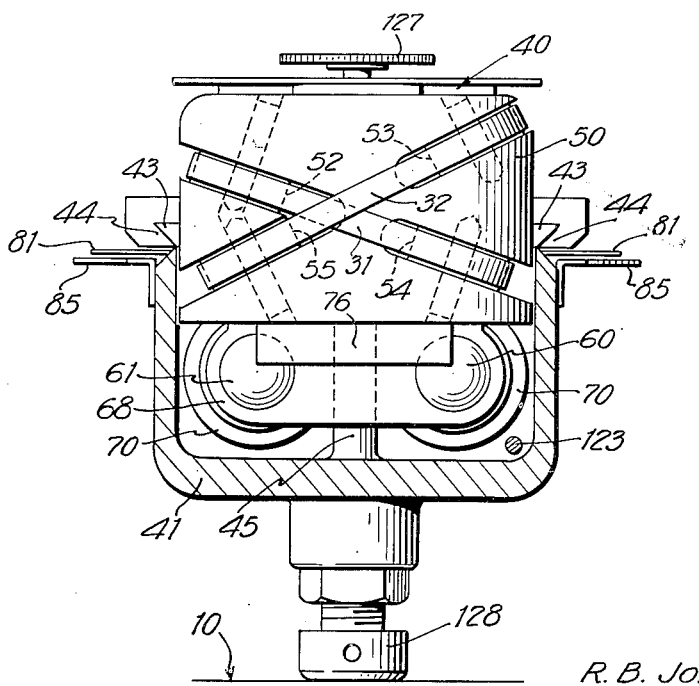

R. B. JOHNSON
H. A. HENDRICH
G. V. A. MALMROS
INVENTORS

BY
ATTORNEY

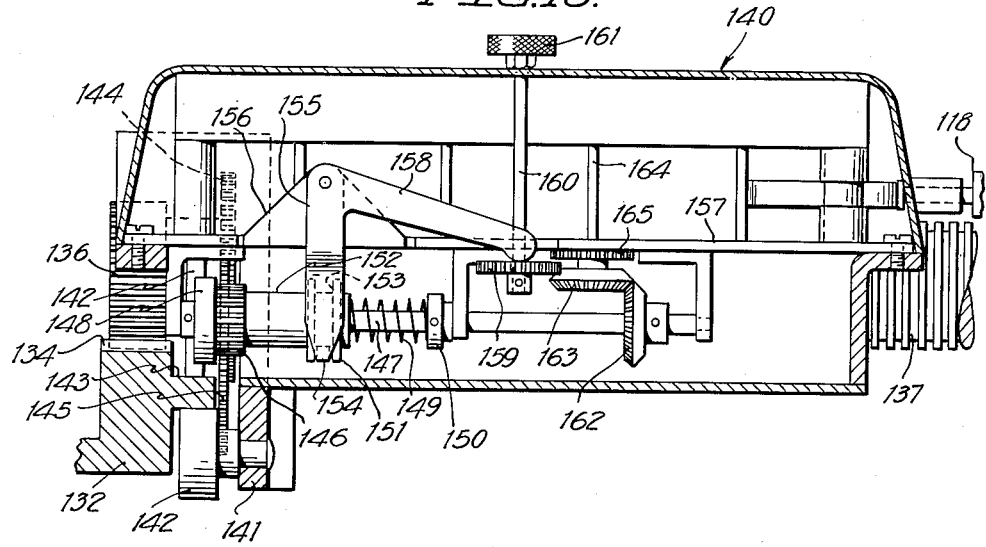

April 1, 1952  R. B. JOHNSON ET AL  2,591,074
HYPERBOLIC POSITION LOCATING DEVICE
Filed Feb. 21, 1945  9 Sheets-Sheet 9
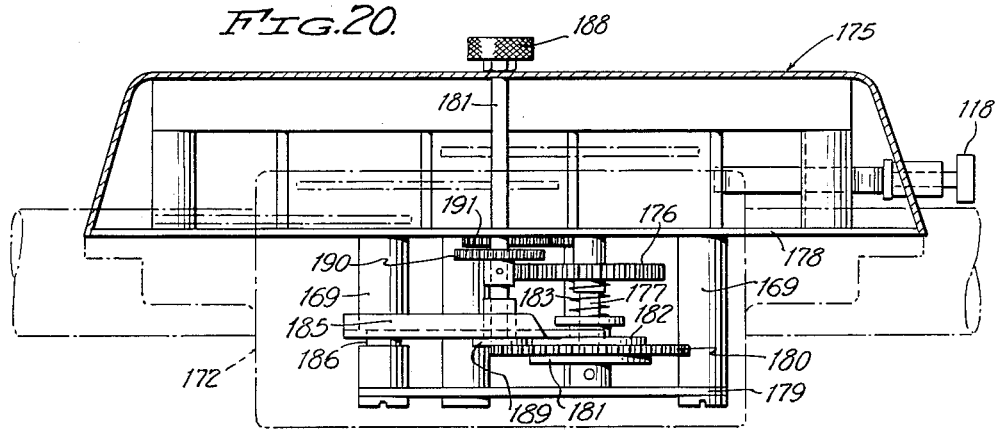
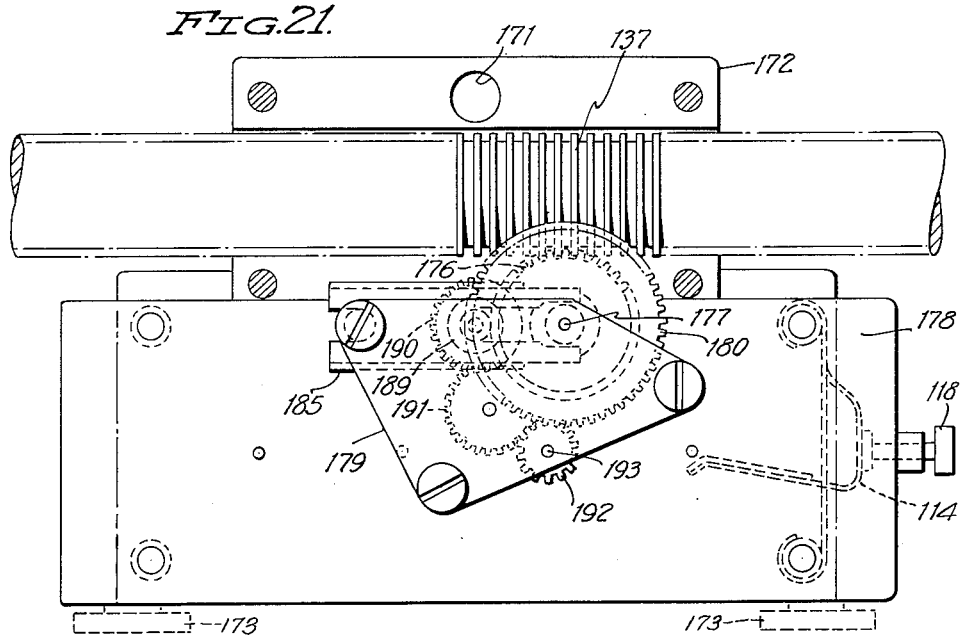
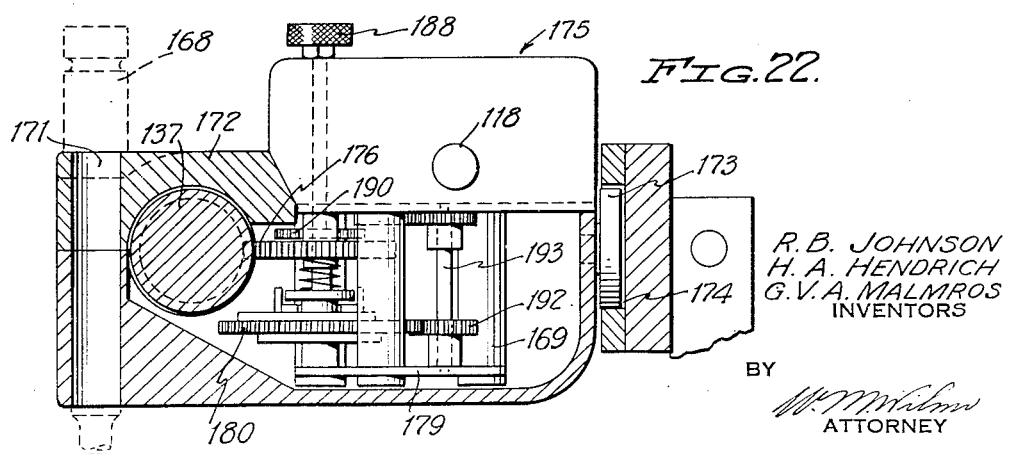
R. B. JOHNSON
H. A. HENDRICH
G. V. A. MALMROS
INVENTORS
BY
ATTORNEY Patented Apr. 1, 1952

2,591,074

UNITED STATES PATENT OFFICE 2,591,074

HYPERBOLIC POSITION LOCATING DEVICE

Reynold B. Johnson, Binghamton, Henry Alfred Hendrich, Endicott, and Gustav V. A. Malmros, Binghamton, N. Y., assignors to International Business Machines Corporation, New York, N. Y., a corporation of New York Application February 21, 1945, Serial No. 579,110

8 Claims. (Cl. 33—189)

This invention relates to a device for locating the position of a point on a surface by the method of intersecting hyperbolas. The principal use contemplated for it at present is determining the position of a party which has been lost in the desert or at sea, where no land marks are available for ascertaining its position.

One object of the invention is to provide a device of the kind described which will determine the position of the unknown point with a high degree of accuracy, but which is sufficiently rugged and compact to become a piece of standard army or navy equipment for field use.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a semidiagrammatic plan view on a larger scale of the pivoted arm, tapes and slave station posts.

Fig. 5 is a detail view of the tape anchoring means and tension gauges.

Fig. 6 is an elevation of a post locating lever.

Fig. 7 is an elevation of a zero setting gauge.

Fig. 8 is a plan view of the bottom part of the arm, with the cover plate and difference setting counters removed.

Figs. 9, 10, and 11 are, respectively, a bottom plan view, a side elevation looking downward toward the right in Fig. 4, and a top plan view of the right hand difference setting counter.

Fig. 12 is a side elevation of the left hand difference setting counter looking downward toward the left in Fig. 4.

Fig. 13 is a vertical section through the board and the pivoted arm with a part of both broken out in the middle.

Fig. 14 is a top plan view of the end of the pivot arm showing the spider which travels thereon.

Fig. 15 is an end elevation of the free end of the pivoted arm.

Figure 16:
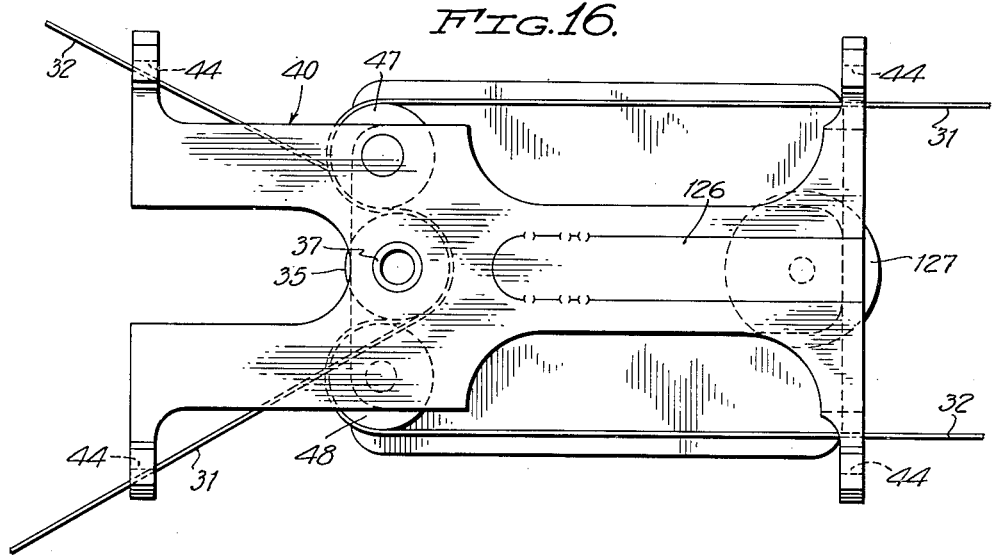

Fig. 16 is a bottom plan view of the spider.

Figure 17:
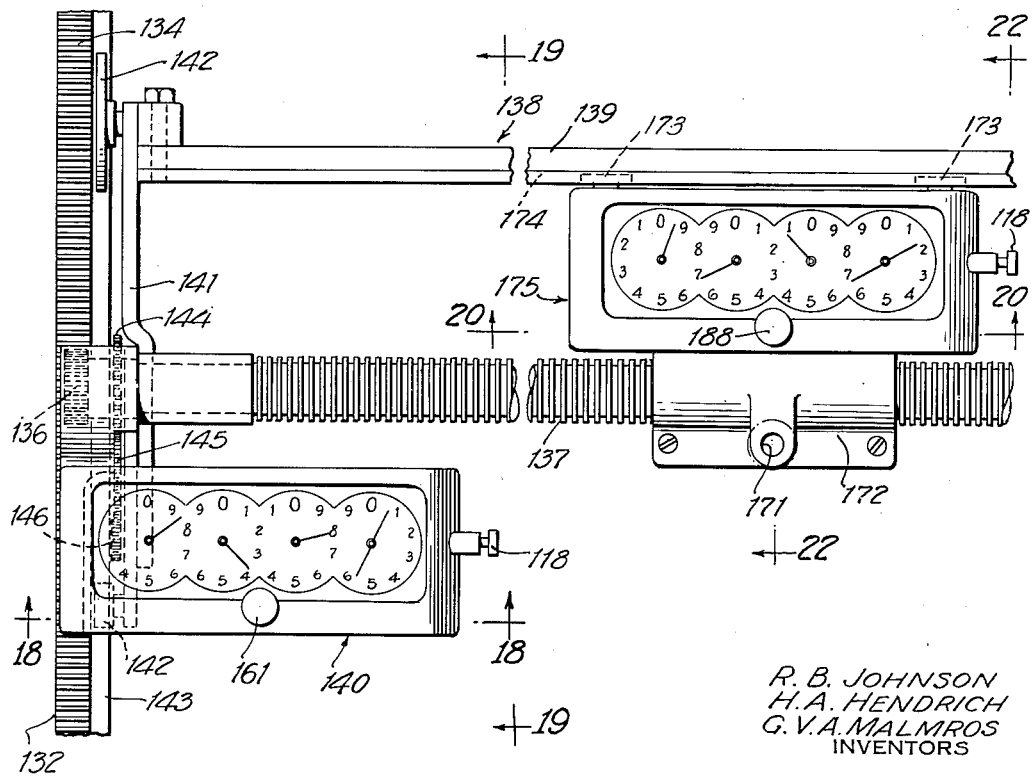

Fig. 17 is a detail plan view of a portion of the top counter mechanisms.

Fig. 18 is a vertical sectional view on the line 18—18 of Fig. 17.

Fig. 19 is a vertical section on the line 19—19 of Fig. 17.

Fig. 20 is a vertical section on the line 20—20 of Fig. 17.

Fig. 21 is a bottom plan view of the horizontal top counter.

Fig. 22 is a vertical section on the line 22—22 of Fig. 17.

The use of the position locating device for the purpose described requires certain additional apparatus to provide data. There is a master station and there are two slave stations, the coordinate positions of which stations on a map are known. The master station must have a signalling apparatus, the slave stations have signal relaying apparatus, and the lost party has apparatus for receiving the signals, which is capable of indicating the elapsed times between the arrival of the signal at the unknown point by the direct path from the master station and the arrival of the signal from the master station by way of the respective slave stations. The elapsed time is converted into distance, in accordance with the speed of travel of the type of signal used. No description of such signaling and receiving apparatus will be given, because it forms no part of the invention.

The problem

Figure 1:
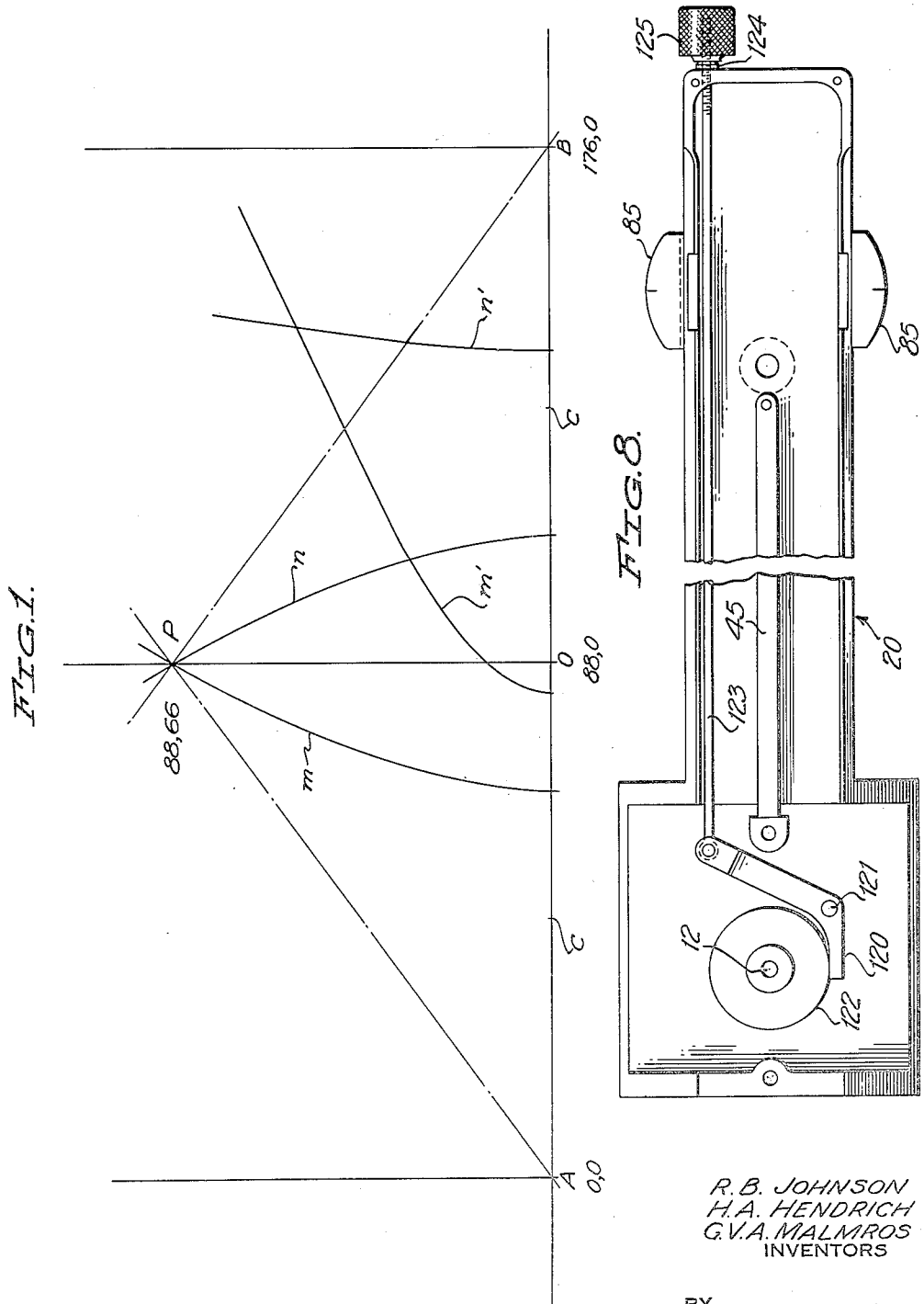
Fig. 1 is a diagram illustrating two typical problems.

Fig. 1 illustrates a typical problem. A party, lost in the desert at an unknown point P, has means for receiving signals from a master station located at the point O, the position of which is known. There are two slave stations located at the known positions A and B. To simplify the problem, these three stations are located in a straight line and the master station is midway between the two slave stations. The slave station A is assumed to have the coordinate position 0,0 the master station has the coordinate position 88,0, meaning 88,000 yards east and 0 yards north, and station B has the coordinates 176,0 meaning 176,000 yards east and 0 yards north.

A signal transmitted from the master station is received at the point P, directly, and via the two slave stations at different times, indicating that the path through each slave station is 132,000 yards different from the path direct from the master station. 88,000 yards of the path through each slave station is represented by the known distance from the master station to the slave station. Subtracting 88,000 from 132,000, the true difference distance, 44,000 yards from the point to each slave station is obtained. This difference distance and the known distances between the master station and the two slave stations are sufficient data to plot two hyperbolas, one having the stations O and A as foci and the other having the stations O and B as foci. It is evident from the fact that the difference distances are identical that the point is located on the two halves of the hyperbolas nearest the station O, and attention will now be directed to these halves particularly identified as $m$ and $n$ in Fig. 1. These two hyperbolas can be plotted by swinging out arcs at different radii from the point O and then swinging about the points A and B arcs having radii differing from each of the first mentioned radii by the addition of 44 units (the difference distance). The position of the point of intersection P can be determined by simultaneously solving the hyperbolic equations of the two graphs.

In order to obtain a result in terms of coordinates, the equation used is $$\frac{(x-h)^2}{a^2} - \frac{(y-k)^2}{b^2} = 1$$

In this equation $h$ and $k$ are the horizontal and vertical coordinates, respectively, of the center C, or C', of the hyperbola. $a$ is ½ the difference distance. $b$ is a constant equal to $$\sqrt{c^2 - a^2}$$

where $c$ is the distance from the center to each focus.

Substituting in the equation the values for the hyperbola $m$ in the given problem, the equation will read $$\frac{(x-44)^2}{22^2} - \frac{y^2}{44^2 - 22^2} = 1$$

This can be expanded to the form $$3x^2 - 3(88x) + 3(44)^2 - y^2 = 3(22)^2$$

Similarly, the equation of the hyperbola $n$ is $$3x^2 - 3(264x) + 3(132)^2 - y^2 = 3(22)^2$$

Solving these equations simultaneously, it is determined that $x = 88$, and $y = \pm 66$. The point P therefore has the coordinates 88, 66; that is to say, it is 66,000 yards due north of station O.

*The computing device*

Figure 2:
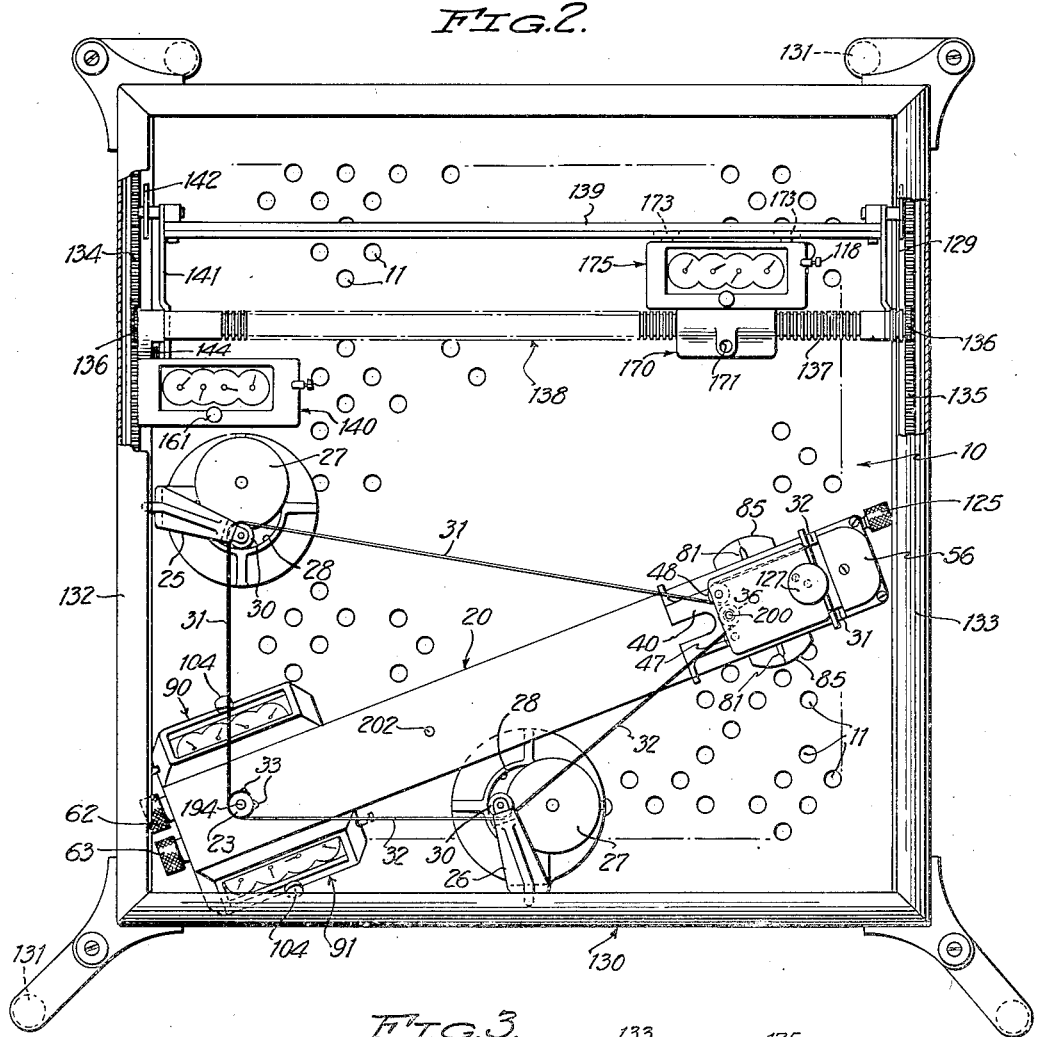
Fig. 2 is a plan view of the point locating device.
Figure 3:
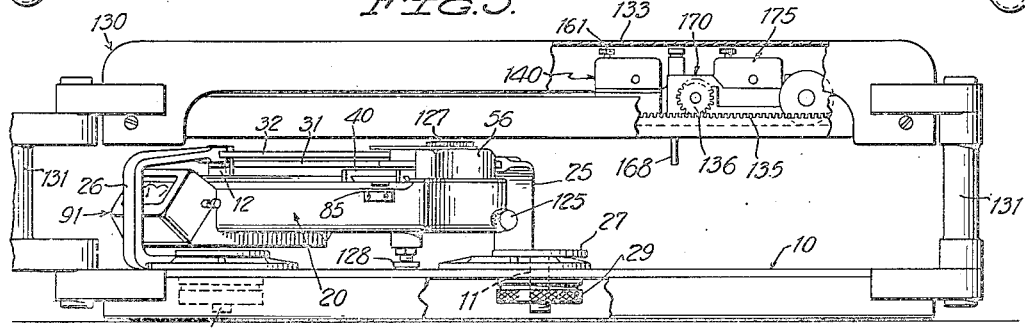
Fig. 3 is a side elevation of the device, looking toward Fig. 2 from the right side.

The purpose of the computing device constituting the invention is to solve a problem of this type mechanically. As shown in Figs. 2 and 3, the computing device is composed of two principal parts: a bottom part for locating the position of the point, and a top part for registering the position of the point in terms of coordinates.

The bottom part comprises a board 10 which has distributed over it a multiplicity of holes 11, to provide means for attaching various parts of the apparatus thereto in different positions. A pivot post 12 (Figs. 3 and 13) is attached to the board at a certain position representing the master station. The post has a threaded lower end 13 to receive a knurled nut 14 which is screwed up to clamp a pair of stabilizing washers 15 against the board 10 between the nut and a shoulder 16 of the pivot post. A pivot arm 20 is rotatably mounted on a step bearing 21 and a stabilizing bearing 22 of the post. The pivot arm comprises a trough-shaped bottom portion 41 and a cover plate 42. The cover plate has fixed to its top side a small roller 23 provided with a set screw 24, which keys into a groove 24' in the top of the pivot post 12.

There are two guide posts 25 and 26 representing, respectively, the slave stations A and B. It will be noted that these slave stations are not necessarily in a straight line with the master station represented by the pivot post 12, but may have any convenient angular relation, such as the 90° relation shown in Fig. 2. Each guide post 25 and 26 is secured to the board by means of a large headed screw 27, the stem of which passes through a large hole 28 in the base of the post and through a selected hole 11 of the board, the hole in the board being selected so that the post can be adjusted, in a manner to be described presently, to position it exactly in accordance with the coordinate position of the slave station which it represents. A large knurled nut 29 screwed on to the stem of the screw bears against the bottom of the board 10 and clamps the base of the post thereto. At its upper end the post is bent laterally and has a small guide roller 30 journalled near its extremity on a vertical axis.

Two steel tapes 31 and 32 are wound part way around the small roller 23, at different levels, and secured thereto by small screws 33. The tapes extend toward the respective guide posts 25 and 26, passing around the rollers 30 thereof, which it will be noted are mounted at different levels, conforming to the levels of the respective tapes. The tapes then pass to respective index rollers 35 and 36 concentrically journalled, one above the other. The index rollers are mounted by a tubular pin 37 (Figs. 4, 13, 14, 16) on a slider 40 which travels along the pivoted arm 20. The edges of the cover plate 42 are beveled to provide guideways 43 (Fig. 15) for tongues 44 on the slider. The cover plate is attached to a vertical web 45 (Fig. 8) in the trough of the arm by screws 46 and by additional means to be described presently.

Two guide rollers 47 and 48 are journaled on the slider at opposite sides of the index rollers 35, 36, the guide roller 48 being at the level of the upper index roller 36 and the guide roller 47 at the level of the lower index roller 35. The tape 31 passes part way around the lower index roller 35, thence around the guide roller 47, toward the extremity of the pivoted arm. The tape 32 passes around the upper index roller 36, thence around the guide roller 48, toward the extremity of the arm. On the outer end of the cover plate 42 there is mounted a bearing block 50, secured to the cover plate by screws 51 and having journaled in slots thereof four guide rollers 52, 53, 54, 55. The tape 31 passes around the guide roller 52 and diagonally downward to pass around the guide roller 54, which directs it back toward the pivot of the arm. The tape 32 passes similarly around the guide rollers 53 and 55 and back toward the pivot of the arm. A cap 56 attached to the block 50 by a screw 57 shields the tapes where they extend around the guide block rollers 52—55.

The pivoted arm contains two micrometer screws 60 and 61 (Figs. 4 and 13), the rear ends of which carry knurled heads 62 and 63 and are journaled in bearings in a plate 64 attached by screws 65 beneath the cover plate 42. A long screw 66 extends through the cover plate and the micrometer screw bearing block into a threaded hole 67 in the bottom portion of the arm. The front ends of the micrometer screws are journaled in a bearing block 68 attached by screws 69 to the cover plate. Each micrometer screw has a threaded nut 70 with a vertical fin 71 adapted to travel in a related groove 73 in the cover plate 42, when the related micrometer screw is turned. Each nut has a guide roller 74 journaled thereon on a vertical axis, around which the respective tape 31, 32 passes and turns back toward the extremity of the arm. The ends of the tape are anchored by means of a pin 75 bearing against the outer side of a block 76 secured to the cover plate 42 by screws 77. The block is slotted to receive the ends of the tapes and is provided with a cover plate 78 to retain them. Near their anchor the tapes pass between guide pins 79, 80 on respective pointers 81. The pointers are pivoted by pins 80 on a block 82 secured to the cover plate by a screw 83. A spring 84 hooked over the upper ends of pins 79 urges the pointers toward the pivot post 12. Ears 85 on the arm are provided with graduations to indicate the position of the pointers. The pins 79, 80 cause the tapes to bend and thus, when tension is applied to the tapes, they will tend to straighten and swing the pointers against the force of the spring 84. This provides a sensitive indication of the tension exerted on the individual tapes.

Mounted on the pivot arm 20 are two counters 90 and 91 (Figs. 9–12) which will be identified herein as the station A difference setting counter and the station B difference setting counter, respectively. These counters are of the simple type employed in electric meters; that is to say, they comprise a series of pointers 92 mounted on shafts 93 geared together at a decimal ratio, so that a complete revolution of the lowest pointer of the series will be accompanied by $\frac{1}{10}$ of a revolution of the second pointer, $1/100$ of a revolution of the third pointer, and $1/1000$ of a revolution of the highest pointer. The simple gearing between the pointer shafts is well known and is omitted in the drawing. The pointers 92 revolve in opposite directions over dials 94 (Fig. 11), on which the numbers 0, 1–9 are arranged in alternately reversed sequence, as in a standard meter.

The counters 90 and 91 are geared to the respective micrometer screws 60 and 61. For this purpose each micrometer screw has a gear 95 meshing with a gear 96 rotatably mounted on a counter shaft 97 journaled on the bottom plate 98 of the counter. The gear 96 is placed between a friction disk 99 fixed to the shaft and a clutch disk 100 slidable on the shaft and urged toward the gear by a spring 101. Thus, the shaft is normally driven through the clutch whenever the micrometer screw is turned. Through bevel gears 102, 103 the motion of the shaft 97 is transmitted to the shaft 93 of the second pointer of the counter. The gearing is such that one revolution of the lowest pointer 92 represents 100 yards of difference distance; thus each small division on the lowest dial represents one yard.

Each counter can be reset to any position by means of a knurled head 104 on a resetting shaft 105. The latter shaft has fixed to it a gear 106 which can be brought into mesh with an idler gear 107 by moving the shaft 105 downward in Fig. 10. The idler gear is in mesh with a gear 108 on the shaft 93 of the second pointer. A bail 109 pivoted on bearings 110 has an arm 111 resting against the gear 106 so as to be moved downward in Fig. 6 when the latter gear is moved to engage the idler gear 107. The bail has a cross arm 112 engaging in a slot 113 in the clutch disk 100 and retracts the clutch to free the counter from the micrometer screw for resetting. The counter 90 shown in Fig. 12 is similar in all respects to the counter 91 shown in Figs. 9–11, except that the counter shaft gear 96 and the micrometer screw gear 95 are at the opposite end of the counter and the other gears are shifted in position accordingly.

Each counter has a slack take-up device comprising a spring clip 114 mounted on posts 115 of the counter and comprising a spring arm 116 which extends over into proximity to the shaft 93 of the lowest pointer. The spring arm 116 carries a friction pad 117 and can be moved into engagement with the shaft 93 by means of a plunger 118 so as to cause the shaft 93 to turn counterclockwise to take up the slack in the gears. This is done before each reading of the counter.

The pivoted arm 20 is provided with friction drag means to control its swinging movement (see Figs. 8 and 13). A bell crank shaped brake lever 120, pivoted at 121 to the bottom part of the arm, bears upon a friction ring 122 fixed to the pivot post 12. The opposite end of the brake arm is articulated to a rod 123 extending the length of the pivoted arm and out through a bushing 124 in the end wall thereof. This end of the arm is threaded to receive knurled nut 125 which rests against the bushing 124. By turning the knurled nut the friction drag means can be tightened or loosened.

The slider is also provided with friction drag means (see Figs. 13 and 16). A flat spring 126 staked to the bottom of the slider is made to bear against the top of the cover plate 42 of the pivoted arm by a large headed screw 127 threaded into a hole in the slider. The outer end of the pivoted arm is supported by a screw 128 which rests upon the board 10.

*The registering devices*

The top part of the computing device comprises a square frame 130 supported above the board 10 by crank shaped pins 131, the offset portions of which can be swung out to provide clearance for the arm 20. The two side bars 132 and 133 of the top frame are provided with two rack bars 134, 135 (Figs. 2 and 17) on which travel two gears 136 fixed to the extremities of a shaft 137 constituting the main frame of a bridge 138. The travel of the bridge is registered by a counter 140, called the vertical top counter. The counter 140 is similar in construction to the difference counters previously described. It is mounted on a carriage 141 in which the shaft 137 is journaled and which is guided by rollers 142 on a flange 143 of the side bar 132. The carriage 141 is connected by a cross bar 139 to a plate 129 hung upon the right end of the shaft 137, thus completing the framework of the bridge 138. The shaft 137, which rotates as the bridge travels, has fixed to it a gear 144 which is connected through an idler gear 145 journaled on the carriage, to a gear 146 rotatably mounted on a countershaft 147 of the vertical top counter 140. The left face of the gear 146 (Fig. 18) is normally pressed against a friction disk 148 affixed to the shaft 147, by a spring 149 which stands under compression between a collar 150 on the shaft 147 and a clutch disk 151 which bears against the end face of an extended hub 152 of the gear. The clutch disk has a groove 153 in which engages a cross bar 154 of a bail 155 pivoted on bearings 156 on the bottom plate 157 of the counter. The bail has an arm 158 which rests upon a gear 159 fixed to a resetting shaft 160 having a knurled head 161 at its upper end. The countershaft 147 is connected by bevel gears 162, 163 to the second pointer shaft 164 of the counter. This shaft also has fixed to it a gear which is obscured by, and in mesh with, an idler gear 165 in Fig. 18. When the resetting shaft 160 is raised to reset the counter, the gear 159 thereon meshes with the gear 165 and the clutch 151 is disengaged.

Mounted on the bridge 138 is a crab 170 having an index hole 171, the center of which is to be aligned with various parts of the device, by means of a king pin 168 (Fig. 22), in a manner to be described, to determine their exact location on the board. The crab has a tubular bearing 172 mounted to slide on the shaft 137 and has at its opposite side rollers 173 traveling in a groove 174 of the cross bar 139. The shaft 137 is a circular rack, the teeth of which serve to operate the indicating mechanism of a counter 175, called the horizontal top counter. A gear 176 meshing with the teeth of the circular rack 137 is fixed to a vertical counter shaft 177 rotatably mounted between the bottom plate 178 of the counter and an auxiliary plate 179 mounted on the latter by posts 169. Rotatably mounted on the shaft 177 is a gear 180 which is positioned between a friction plate 181 fixed to the shaft 177 and a clutch plate 182 pressed toward the gear by a spring 183. The clutch plate has a groove 184 in which engages the fork of an operating arm 185 pivoted in a slot 186 of one of the supporting posts 169. A resetting shaft 187 having a knurled head 188 extends through the counter 175 and through a slot in the arm 185, having fixed to its lower end a plate 189. When the resetting shaft 187 is raised, it lifts the clutch operating arm 185 and releases the clutch. At the same time a gear 190 fixed to the resetting shaft is brought into mesh with an idler gear 191, which meshes with a gear 192 fixed to the second pointer shaft 193 of the counter 175. Thus, by turning the resetting shaft after raising it the counter can be reset to any position. The gear 180 meshes with a gear 192 fixed to the pointer shaft 193, to establish the normal driving connection between the rack bar 137 and the counter 175. Both of the top counters 140 and 175 are provided with slack take-up devices identical to the one previously described on the difference setting counters. These are operated by knobs 118.

Operation

The operation of the computing device will now be described, with particular reference to Figs. 1, 2, and 4. It will be assumed that the master station and the two slave stations are on one straight line and have the coordinate positions indicated in Fig. 1.

The first operation is to locate the pivot post 12 of the arm 20 in a suitable position for the problem, considering the data. The problem to be discussed indicates a position of the pivot post at the middle of the board near the lower edge (considering the board as being positioned in front of the operator as shown in Fig. 2). After the pivot post is secured to the board in the manner described, the top counter mechanism is moved to bring the index hole 171 over the axial hole 194 of the roller 23 and the king pin 168 is inserted through the two holes. Thereupon, the vertical top counter 140 is reset to zero and the horizontal top counter 175 is reset to 88,000 conforming to the coordinate position of the pivot post 12.

The next step is to position the two posts 25 and 26 representing the slave stations A and B. The station A has the coordinates 0,0. The king pin is inserted through the index hole 171 in the crab, into a hole 195 in the center of the roller 30 of the post 25 which is to be positioned at station A and the assembly is moved until the horizontal top counter has a reading of approximately zero, the vertical top counter remaining approximately at zero. With the post 25 in this position, a hole 11 in the board is selected which provides the largest clearance within the large opening 28 in the bottom of the post. The locking stud 27 is inserted and the knurled nut 29 tightened against the bottom of the board. Thereupon, the pivot pin 196 of the special lever 197 shown in Fig. 6 is inserted in a suitable hole in the board and the lever is pressed against the base of the post 25, to nudge it into the exact position corresponding to the coordinates of station A, as indicated by the top counters 140 and 175. In taking the reading of the counters, the plunger 118 is always pressed to take up the slack in the gears of the counter. The reading should be within one small division of the lowest dial of the counter, representing 10 yards.

The procedure for positioning the post representing station B is similar, the only difference being that the counters are moved to the coordinate position 176,000,0.

Now the tapes 31, 32 and difference setting counters 90, 91 are to be adjusted to zero setting. For this purpose the swinging arm 20 is brought over toward the post 25 at station A and the slider 40 is moved into position so that the zero setting gauge 198 shown in Fig. 7 can have the long slender pin 199 at one end inserted through the index hole 200 in the slider, and the longer end 201 of the pin at the opposite end of the gauge inserted into the hole 195 in the post at roller 30. Also, the slider is positioned so that the pin 199 will drop into a hole 202 in the cover plate of the arm 20. The hole 202 is exactly the same distance from the hole 194 in post 12 as the pin 199 is from the pin 201. It may be necessary to turn the left hand micrometer screw in the direction to provide slack in the tape 31 to enable the slider to be brought into the proper position. When the zero gauge is in position the axis of the arm 20 is in the position indicated by the dot and dash line I and the hole 200 is exactly equidistant from the holes 194 and 195. Then, the left hand micrometer screw 60 is turned clockwise by the knob 62 until the tape tension gauge pointer just leaves its normal position. Thereupon the left hand difference setting counter 90 is reset, by means of the resetting knob 104, to the distance between stations O and A, namely 88,000. This is the zero setting of the left hand difference setting counter.

The same procedure is followed in the zero setting of the right hand difference setting counter 91, except that the gauge 198 is inserted with the shorter pin 203 in the hole 204 of the right hand post 26 due to the higher elevation of the roller 30 of that post. The right hand difference setting counter 91 is reset to the distance between stations O and B, which is also 88,000.

The device is now ready for computation of the problem. The data shows that the difference reading on both sides is to be 132,000. Accordingly, both micrometer screws are turned counterclockwise to set the difference setting counters to 132,000. This puts slack in the tapes, but they are sufficiently confined by various guide means shown in the drawing generally to prevent them from getting off the rollers. In any case, the tapes and rollers are accessible at all times, to enable the tapes to be restored if they should come off the rollers. If only the tape 31 were present and the arm were held to the right as far as permitted by this tape, and the slider 40 were then moved along the arm 20, the center of the index hole 200 would trace the hyperbola m. This is because for each unit of travel of the slider outward along the arm an equal length of tape will be fed over the index roller 35. In other words, the length of tape between the rollers 30 and 35 increases at the same rate as the distance between the centers of the holes 194 and 200. For the same reason, if only the tape 32 were present and the arm were held to the left as far as permitted by the tape, while moving the slider along the arm, the center of the hole 200 would trace the hyperbola n. Consequently, with the difference settings described, the index hole 200 of the slider will be somewhere in the area between the two hyperbolas, above their point of intersection. This is necessarily so because the left hand tape prevents the index hole in the slider from moving into the area on the right of the hyperbola m and the right hand tape prevents it from moving into the area to the left of the hyperbola n. The slider is now moved toward post 12 until both tension gauges 81 indicate a slight tension of the tapes, the arm and the two tapes acting as guide elements to guide the rollers 35 and 36 to the position where the center of the hole 200 stands at the intersection of the two hyperbolas m and n. When the gauges 81 show the same slight tension on the two tapes the slider is locked in position on the arm by turning the brake screw 127 down. Then the crab 170 is moved to bring its index hole 171 over the index hole 200 of the slider and the two holes are aligned by means of the king pin 168. Readings are then taken from the two top counters, first pressing the plungers 118 in each case. These readings give the coordinates of the unknown point, namely 88,000, 66,000.

If the difference reading pertaining to station A had been 166,000 and the difference reading pertaining to station B had been 66,000, the unknown point would be at the intersection of the two hyperbolas m' and n' in Fig. 1. The position of the arm for detecting this intersection is indicated by the dot and dash line II in Fig. 4. In bringing the slider toward the post 12 the resistance offered by the left hand tape cannot be easily felt because the movement is almost parallel to this tape. Nevertheless, the intersection point can be accurately determined, because the pull on the left hand tape is not reduced on account of the angular position of the pivoted arm and is delicately recorded by the tape tension gauge 81.

It has been possible with the first model of the device to locate the position of the unknown point within a few hundred yards, based on a maximum distance between stations A and B of 176,000 yards or 100 miles, and the same maximum distance between the unknown point and the farthest station from it.

It will be observed that while the tapes do not pass exactly through the centers of the holes 194, 195, 200, and 204, each tape has an effective wrap of 360° around the three rollers 23, 30, 35 or 36, which is maintained in all positions of the swinging arm and slider, the greater wrapping of a tape around a particular roller, as the guide rollers assume different relative positions, being completely compensated by an unwrapping of the tape from another roller, thus minimizing errors.

It has been found that the meter counters shown in the illustrative embodiment have particular advantages for this use. They permit sudden stops and starts and allow the crab and bridge to move freely back and forth. Also, they have a large capacity and at the same time permit fine readings.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for computing, by the method of intersecting hyperbolas, the position of a point lying within a given area between the sides of an angle formed by the lines passing through a master station and each of two slave stations, given the two differences between the distance from the point to the master station and the distances from the point to each of the two slave stations; a board having an area representative of the area within which the point is supposed to be located, an arm pivoted to the board at a point representing the position of the master station, two posts located at different points representing, respectively, the positions of the two slave stations, a slider on said arm movable longitudinally thereof, guide means on said slider, two tapes each having one end anchored at the pivot of the arm and the other end anchored near the extremity of the arm, with slack between, one of said tapes passing around one of said posts and the other passing around the other post, and both tapes passing through said guide means, and means for adjusting the length of each tape individually to conform to said differences, respectively, the point being determined by the position of said guide means when said slider is moved toward the pivot of the arm until both tapes are taut.

2. A computing device as described in claim 1, wherein said means for adjusting the length of each tape individually comprises a pulley for each tape journaled on an individual member adjustable longitudinally of said arm, each tape having a loop passing around the related pulley which can be enlarged or allowed to contract by adjustment of the member on which the pulley is mounted.

3. A computing device as described in claim 1, wherein the means for adjusting the length of each tape individually comprises, for each tape, a micrometer screw journaled on an axis parallel to said arm, a nut on said screw, a pulley journaled on said nut, each tape passing from said slider guide means around stationary guide means at the swinging end of said arm, thence in a loop around the related one of said pulleys, the end of the tape being fastened to said arm near its swinging end, and means to prevent said nut from turning while permitting the same to travel longitudinally of said arm, whereby by turning one of the micrometer screws the related nut can be made to travel to enlarge the loop in the respective tape, or to allow the loop to contract, depending upon the direction of rotation of the micrometer screw.

4. A computing device as described in claim 1, wherein the means for adjusting the length of each tape individually comprises, for each tape, a micrometer screw journaled on an axis parallel to said arm, a nut on said screw, a pulley journaled on said nut, each tape passing from said slider guide means around stationary guide means at the swinging end of said arm, thence in a loop around the related one of said pulleys, the end of the tape being fastened to said arm near its swinging end, means to prevent said nut from turning while permitting the same to travel longitudinally of said arm, whereby by turning one of the micrometer screws the related nut can be made to travel to enlarge the loop in the respective tape, or to allow the loop to contract, depending upon the direction of rotation of the micrometer screw, and a meter counter geared to each micrometer screw at a ratio such as to indicate the distance represented by any change in the length of the tape between said stationary guide means and the pivot of the arm caused by rotation of the related micrometer screw.

5. A computing device as described in claim 1, wherein the means for adjusting the length of each tape individually comprises, for each tape, a micrometer screw journaled on an axis parallel to said arm, a nut on said screw, a pulley journaled on said nut, each tape passing from said slider guide means around stationary guide means at the swinging end of said arm, thence in a loop around the related one of said pulleys, the end of the tape being fastened to said arm near its swinging end, means to prevent said nut from turning while permitting the same to travel longitudinally of said arm, whereby by turning one of the micrometer screws the related nut can be made to travel to enlarge the loop in the respective tape, or to allow the loop to contract, depending upon the direction of rotation of the micrometer screw, a meter counter disengageably geared to each micrometer screw at a ratio such as to indicate the distance represented by any change in the length of the tape between said stationary guide means and the pivot of the arm caused by rotation of the related micrometer screw, and manually operable means for setting said meter counter to any desired reading when disengaged from said micrometer screw.

6. In a device for computing, by the method of intersecting hyperbolas, the position of a point lying within a given area between the sides of an angle formed by the lines passing through a master station and each of two slave stations, given the two differences between the distance from the point to the master station and the distances from the point to each of the two slave stations; a board having an area representative of the area within which the point is supposed to be located, an arm pivoted to the board at a point representing the position of the master station, two posts located at different points representing, respectively, the positions of the two slave stations, a slider on said arm movable longitudinally thereof, guide means on said slider comprising two index rollers coaxially mounted, one above the other, and two auxiliary rollers, one mounted at one side of one of said index rollers and the other mounted at the other side of the other one of said index rollers, two tapes each having one end anchored at the pivot of the arm and the other end anchored near the extremity of the arm, with slack between, one of said tapes passing around one of said posts, thence around one of said index rollers and, with a reverse bend, around the adjacent auxiliary roller, the other tape passing around the other one of said posts, thence around the other one of said index rollers and, with a reverse bend, around the adjacent auxiliary roller, and means for adjusting the length of each tape individually to conform to said differences, respectively, the point being determined by the position of said index rollers when said slider is moved toward the pivot of the arm until both tapes are taut.

7. A computing device as described in claim 6, wherein said posts have rollers around which the tapes pass rotatably mounted at the different levels at which the related index rollers are mounted, respectively, said post rollers being mounted with clearance above and below, whereby the pivoted arm can swing to position said index rollers close to either post roller without interference by said auxiliary rollers.

8. In a point locating apparatus, a board, an arm pivoted on an axis normal to said board; two posts mounted on said board on opposite sides of said arm, in predetermined positions in relation to the pivot of said arm; two flexible elements comprising normally slack portions supported at one end on a fixed part of said arm remote from its pivot and at the other end at the arm pivot, and intermediate their ends, respectively, on said posts; a slider on said arm having point representing means, said flexible elements being crossed over each other around said point representing means, so that when said slider is moved on said arm toward said pivot said flexible elements will become taut and stop said movement; and separate means for independently adjusting the lengths of said normally slack portions of said flexible elements.

REYNOLD B. JOHNSON.
H. ALFRED HENDRICH.
GUSTAV V. A. MALMROS.

REFERENCES CITED

The following references are of record in the file of this patent:

UNITED STATES PATENTS

| Number | Name | Date |
|---|---|---|
| 1,001,658 | Lund | Aug. 29, 1911 |
| 1,191,906 | Miller | July 18, 1916 |
| 1,370,645 | Hawkes | Mar. 8, 1921 |
| 1,529,293 | Beulwitz | Mar. 10, 1925 |
| 1,615,668 | Anderson | Jan. 25, 1927 |
| 2,197,505 | Mosher | Apr. 16, 1940 |
| 2,341,107 | MacDonald | Feb. 8, 1944 |
| 2,422,025 | Luck | June 10, 1947 |
| 2,493,786 | Swift | Jan. 10, 1950 |

FOREIGN PATENTS

| Number | Country | Date |
|---|---|---|
| 19,824 | Great Britain | 1890 |
| 176,676 | Great Britain | Mar. 16, 1922 |
| 640,276 | Germany | Dec. 28, 1936 |